United States Patent
Ying

(10) Patent No.: US 6,941,835 B2
(45) Date of Patent: Sep. 13, 2005

(54) OVERTURNING AND FOLDING DEVICE FOR HANDLEBAR

(76) Inventor: Xiongxin Ying, No. 28, Huan Zhen Nan Road, Zhi Ying Town, Yong Kang City, Zhe Jiang Province (CN), 321306

( * ) Notice: Subject to any disclaimer, the term of this patent is extended or adjusted under 35 U.S.C. 154(b) by 0 days.

(21) Appl. No.: 10/729,781

(22) Filed: Dec. 5, 2003

(65) Prior Publication Data

US 2004/0112167 A1 Jun. 17, 2004

(30) Foreign Application Priority Data

Dec. 5, 2002 (CN) ........................................ 02280220 U

(51) Int. Cl.[7] ............................................. B62K 21/16
(52) U.S. Cl. ........................ 74/551.3; 74/278; 74/551.1
(58) Field of Search ............................. 74/551.1, 551.3, 74/493; 280/279, 278, 287

(56) References Cited

U.S. PATENT DOCUMENTS

| 5,492,350 A | * | 2/1996 | Pan | 280/278 |
|---|---|---|---|---|
| 5,934,153 A | * | 8/1999 | Yang | 74/551.3 |
| 6,641,159 B1 | * | 11/2003 | Fan | 280/278 |
| 6,776,429 B2 | * | 8/2004 | Chou | 280/279 |

FOREIGN PATENT DOCUMENTS

| JP | 2004-34845 | * | 2/2004 | ............ 74/551.3 |

* cited by examiner

*Primary Examiner*—Vinh T. Luong
(74) *Attorney, Agent, or Firm*—Welsh & Katz, Ltd.

(57) ABSTRACT

An overturning and folding device for a handlebar includes a tube (2) extending vertically from the handlebar base (13), a connecting member (15) next to the base (13), an eccentric axle (1) and a lug bolt (12). A first hole (21) in the axial direction and a second hole (20) in the perpendicular direction relative to the first hole are formed at the handlebar base (13) of said tube (2), which communicate with each other. The connecting member (15) is engaged to the fork of the bicycle, which defines a space (14) through which the lug bolt (12) can rotate from an axial position to a perpendicular position. The lug bolt (12) is fixed within the first hole (21) and space (14) by a fastener (8). The eccentric axle (1) is fitted rotatable in the second hole (20) and a third hole (5) on the head of the lug bolt (12).

7 Claims, 3 Drawing Sheets

OVERTURNING AND FOLDING DEVICE FOR HANDLEBAR

TECHNICAL FIELD

The present invention relates to a folding device, in particular to a folding device for handlebar of an electrobicycle or ordinary bicycle.

BACKGROUND ART

To facilitate transportation, packing and carrying, the handlebar assembly of electrobicycle or ordinary bicycle is generally designed to be of foldable structure. The current means of folding the handlebar assembly of an electrobicycle or ordinary bicycle is generally to hinge the front fork tube and then to fix them by tightening screws. Although folding of the handlebar assembly can be achieved in this way, yet in operation, tools must be used to amount and dismount the screws in order to proceed the folding. The folding is not only troublesome but also time-consuming. Additionally, when the handlebar assembly is folded in this way, the direction of folded handlebar can not be changed to the same direction of the bicycle body. As a result, only the height of the bicycle can be decreased, but the width of the bicycle body and whole dimension of its package are still rather bulky.

SUMMARY OF THE INVENTION

To overcome the shortcomings of prior art that tools must be used to proceed the folding of electrobicycle or ordinary bicycle and the folded body is still bulky, the object of present utility is to provide an overturning and folding device for handlebar which can be folded more conveniently and more timesavingly and can be rotated to the direction in line with the main body.

The technical solution adopted by the present utility is that the device comprise a tube extending vertically from the handlebar base, a connecting member next to the handlebar base, an eccentric axle and a lug bolt, a first hole in the axial direction and a second hole in the perpendicular direction relative to the first hole are formed on the handlebar base of said tube, which communicate with each other, said connecting member is engaged to front fork of bicycle, which defines a space through which the lug bolt can rotate from the axial position to the perpendicular position. The lug bolt is fixed within said first hole in the axial direction and said space by a fastener, and said eccentric axle is fitted rotatably in the second hole in the perpendicular direction and a third hole on the head of the lug bolt.

A protrusion on the end is provided to match a recess formed in corresponding position of said connecting member, said protrusion and recess are wedge-shaped.

A shim hinged to the connecting member rotatable around said lug bolt is provided between the connecting member and the fastener.

The device further comprises a torsion spring, one end of the torsion spring fixed to the connecting member and the other end disposed on the shim.

Said eccentric axle is connected with a lever.

In the present invention, with rotation of the eccentric axle, the lug bolt is made to move axially in the hole, so as to loosen or tighten the connection of the handlebar tube and connecting member. The match of the wedge-shaped recess of the connecting member with the wedge-shaped protrusion of end keeps the handlebar in working position without wobbling leftwards and rightwards. The turnover shim provides a space for axial movement of the handlebar at the time of folding. The torsion spring can ensure that the turnover shim is pressed tightly on the lug bolt, so that when the connection of the handlebar and the connecting member are loosened with each other, the turnover shim will not come apart from the lug bolt, safe driving is guaranteed. The space provided on the connecting member can make the handlebar rotate to the direction in line with the main body at the time of folding. The device has such advantages as reasonable construction, more convenient and timesaving folding operation, smaller dimension after folding, and beautiful, tasteful outward appearance, etc.

DETAILED DESCRIPTION OF THE INVENTION

Figure 1:
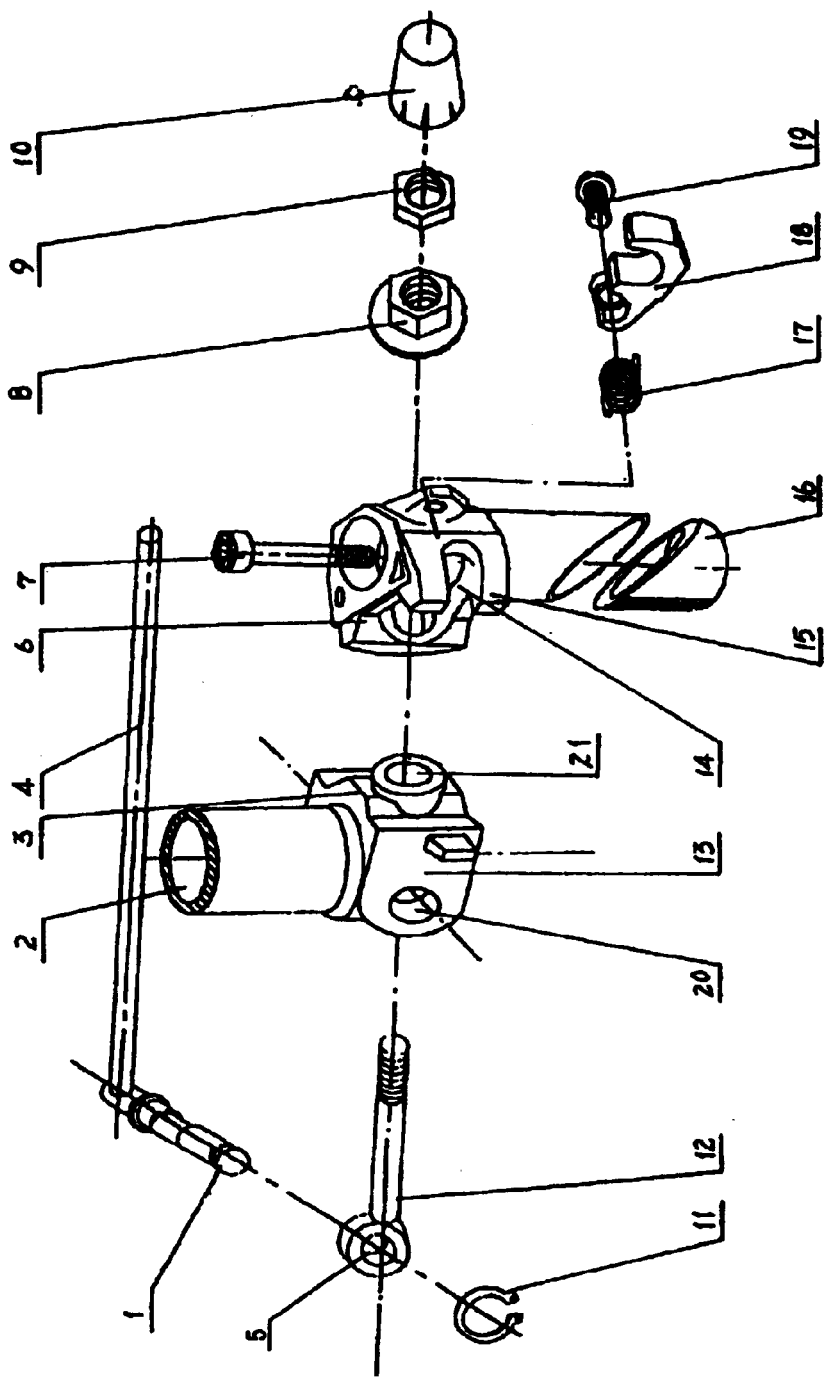
FIG. 1 is an exploded view of the structure of the overturning and folding device for handlebar according to the present invention.

FIG. 1 shows the specific embodiment of the overturning and folding device for handlebar of the present invention. An upright tube 2 extends downward from handlebar (not shown), a second hole 20 in the perpendicular direction relative to a first hole 21 for receiving an eccentric axle 1 and the first hole 21 in the axial direction for receiving a lug bolt 12 are formed on a handlebar base 13 of the tube 2, which communicate with each other. At the crossing point, the eccentric axle 1 passes through a third hole 5 on the head of the lug bolt 12 to drive the lug bolt 12 moving in the axial direction. A connecting member 15 is connected with the front fork tube 16 by means of bolt 7 which defines a space 14 for receiving the lug bolt 12, in which the bolt 12 can rotate from axial position to perpendicular position. The interface (not shown) between the handlebar base 13 and connecting member 15 may be plane. Preferably, the base 13 has a wedge-shaped protrusion 3 matching a wedge-shaped recess 6 formed on connecting member 15 to achieve a more reliable connection.

Insert the lug bolt 12 into the first hole 21, and then put the eccentric axle 1 into the second hole 20 on the handlebar base 13 of handlebar tube 2 and the third hole 5 of lug bolt 12 successively, one end of eccentric axle 1 is connected with a lever 4 and the other end is fixed with a garter spring 11. The handlebar base 3 and connecting member 15 is fastened by connection of lug bolt 12 and fastener 8, the fastener 8 is a nut. Between the connecting member 15 and the fastener 8 a semicircular turnover shim 18 is provided, the turnover shim 18 is hinged to the connecting member 15 and is rotatable around lug bolt 12. A torsion spring 17 is provided to ensure the shim 18 to contact the lug bolt 12. One end of the torsion spring 17 is fixed on the connecting member 15 and the other end is disposed on the turnover shim 18. A thin nut 9 is amounted on the lug bolt 12 next to nut 8 to prevent the fastener 8 from loosening. A plastic cap 10 is covered on nut 8 and nut 9 to enhance the aesthetic vision of appearance.

Figure 2:
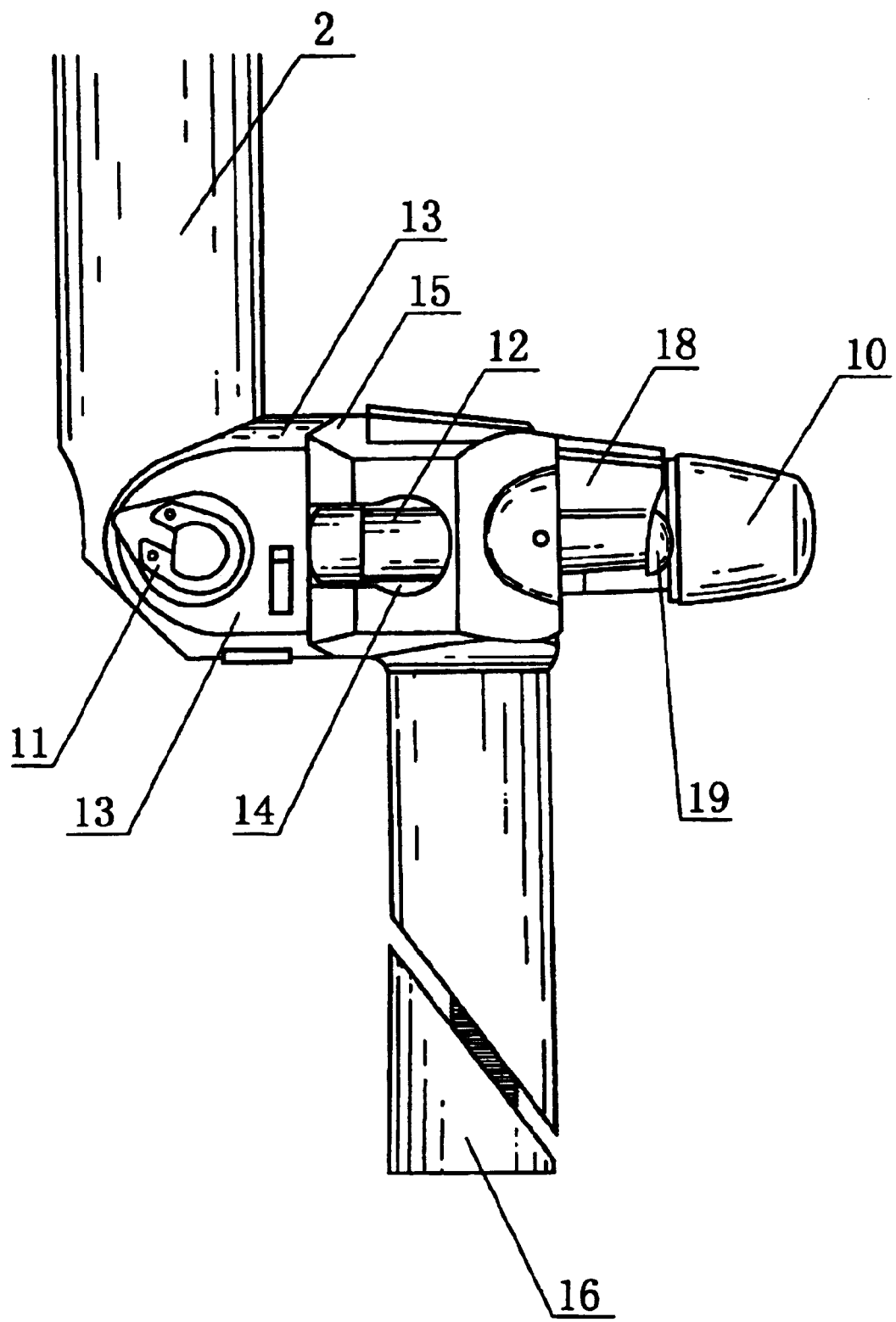
FIG. 2 is schematic diagram of the structure of the overturning and folding device for handlebar in fastening status.
Figure 3:
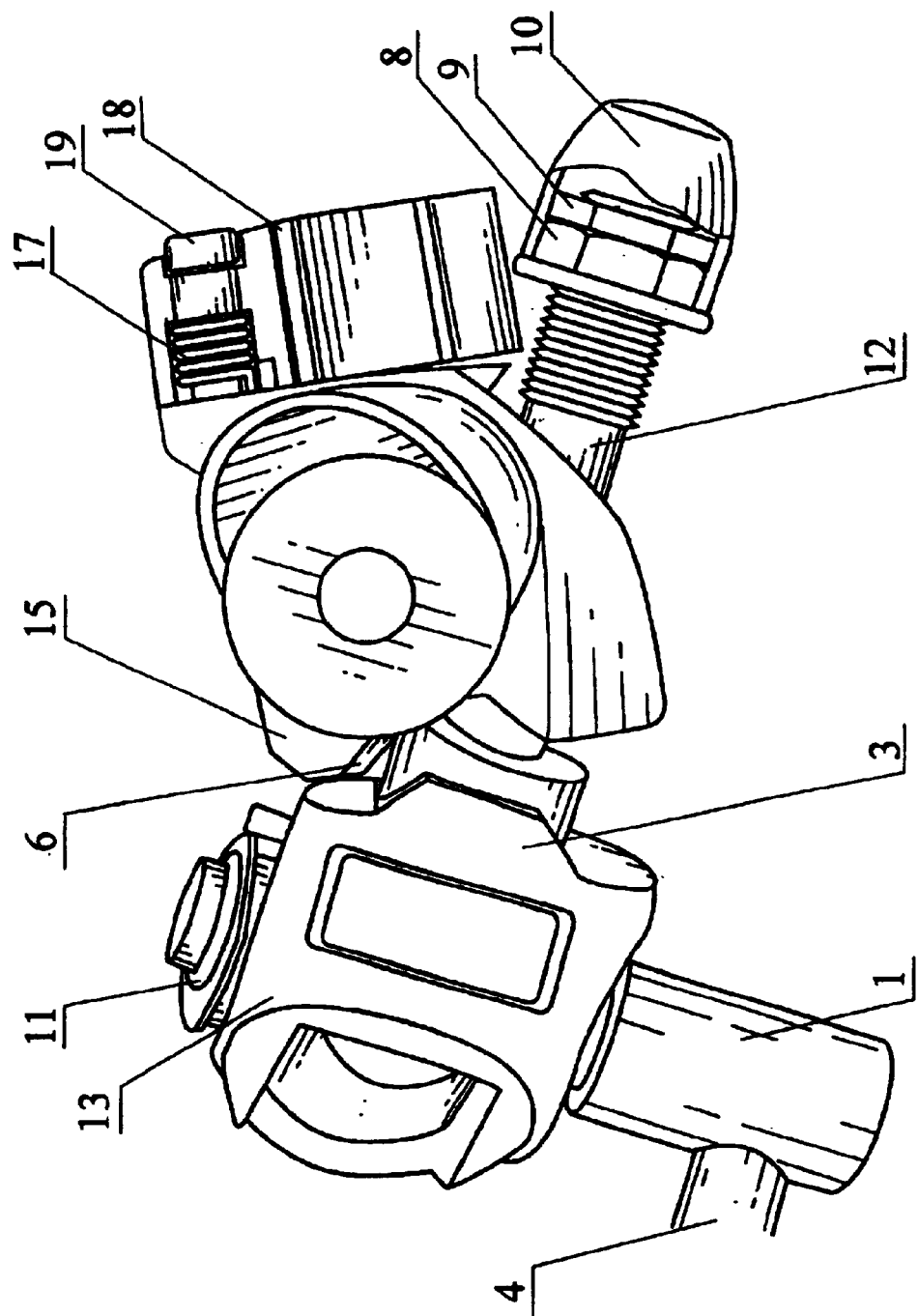
FIG. 3 is a schematic diagram of the structure of the overturning and folding device for handlebar while folding.

Refer to FIG. 2 and FIG. 3, in working position, the eccentric axle 1 is partial to the opposite side of connecting member 15. The wedge-shaped protrusion 3 of the base 13 and the wedge-shaped recess 6 of the connecting member 15 matches with each other and fixed by means of the lug bolt 12, the turnover shim 18, the fastener 8, the thin nut 9 and the plastic cap 10. When folding proceeds, the lever 4 is first turned, and then the eccentric axle 1 rotates along with it. The central of the eccentric axle 12 becomes close to the connecting member 15, as a result, the lug bolt 12 is made to move axially and the match of the base 13 and the connecting member 15 becomes loose. Then turn round the turnover shim 18 to detach it from the lug bolt 12, so that the handlebar base 13 and the connecting member 15 can have space for axial movement and rotation. Pull the base 13 to separate the wedge-shaped protrusion 3 from recess 6 of connecting member 15, and turn the lug bolt 12 to perpendicular direction as well as tube 2, then turn the handlebar (not shown) for 180° around lug bolt 12 to make the handlebar assembly in line with the bicycle body (not shown), so the operation of folding is completed.

Conversely, at the time of unbending, turn handlebar to its upright position, and embed the protrusion 3 of the base 13 into recess 6 of connecting member 15, turn shim 18 to press the lug bolt 12, finally, pull the lever 4 to fastening position, the central of eccentric axle 1 as well as the lug bolt 12 move to the opposite side the connecting member 15 so as to fasten the connection of base 13 and connecting member 15. The connection between handlebar and front fork 16 can be easily achieved as well by the aforesaid structure.

I claim:

1. An overturning and folding device for a handlebar, comprising: a tube (2) extending vertically from a handlebar base (13), a connecting member (15) next to the handlebar base (13), an eccentric axle (1) and a lug bolt (12);

a first hole (21) in an axial direction and a second hole (20) in a perpendicular direction relative to the first hole (21) are formed at the handlebar base (13) of said tube (2), which communicate with each other, said connecting member (15) being engaged to a fork (16) of a bicycle, which defines a space (14) through which the lug bolt (12) can rotate from an axial position to a perpendicular position, wherein the lug bolt (12) is fixed within said first hole (21) and space (14) by a fastener (8), and wherein said eccentric axle (1) is fitted rotatable in the second hole (20) and a third hole (5) on a head of the lug bolt (12).

2. The overturning and folding device for a handlebar according to claim 1, wherein a protrusion (3) on the handlebar base (13) is provided to match a recess (6) formed in a corresponding position of said connecting member (15).

3. The overturning and folding device for a handlebar according to claim 2, wherein said protrusion (3) and recess (6) are wedge-shaped.

4. The overturning and folding device for a handlebar according to claim 3, wherein a shim (18) hinged to the connecting member (15) that is rotatable around said lug bolt (12) is provided between the connecting member (15) and the fastener (8).

5. The overturning and folding device for a handlebar according to claim 4, further including a torsion spring (17), an end of the torsion spring (17) being fixed to the connecting member (15) and an other end disposed on the shim (18).

6. The overturning and folding device for a handlebar according to claim 1, wherein said eccentric axle (1) is connected to a lever (4).

7. The overturning and folding device for a handlebar according to claim 6, wherein said fastener (8) is a nut.

\* \* \* \* \*

UNITED STATES PATENT AND TRADEMARK OFFICE
CERTIFICATE OF CORRECTION

PATENT NO. : 6,941,835 B2
DATED : September 13, 2005
INVENTOR(S) : Xiongxin Ying It is certified that error appears in the above-identified patent and that said Letters Patent is hereby corrected as shown below:

<u>Column 4,</u>
Lines 8 and 9, should read -- ...said eccentric axle (1) is fitted rotatably in the second hole... --.

Signed and Sealed this

Twenty-second Day of November, 2005

JON W. DUDAS
*Director of the United States Patent and Trademark Office*